(12) United States Patent
Walker et al.

(10) Patent No.: US 10,534,540 B2
(45) Date of Patent: Jan. 14, 2020

(54) MEMORY PROTOCOL

(71) Applicant: Micron Technology, Inc., Boise, ID (US)

(72) Inventors: Robert M. Walker, Raleigh, NC (US); James A. Hall, Jr., Boise, ID (US)

(73) Assignee: Micron Technology, Inc., Boise, ID (US)

( * ) Notice: Subject to any disclaimer, the term of this patent is extended or adjusted under 35 U.S.C. 154(b) by 143 days.

(21) Appl. No.: 15/182,821

(22) Filed: Jun. 15, 2016

(65) Prior Publication Data
US 2017/0351433 A1    Dec. 7, 2017

Related U.S. Application Data

(60) Provisional application No. 62/346,201, filed on Jun. 6, 2016.

(51) Int. Cl.
G06F 12/00 (2006.01)
G06F 3/06 (2006.01)
G06F 12/02 (2006.01)

(52) U.S. Cl.
CPC .......... *G06F 3/0605* (2013.01); *G06F 3/0656* (2013.01); *G06F 3/0659* (2013.01); *G06F 3/0683* (2013.01); *G06F 12/0246* (2013.01); *G06F 2212/261* (2013.01); *G06F 2212/7203* (2013.01); *G06F 2212/7207* (2013.01)

(58) Field of Classification Search
CPC .... G06F 3/0605; G06F 3/0656; G06F 3/0659; G06F 3/0683
See application file for complete search history.

(56) References Cited

U.S. PATENT DOCUMENTS

| | | | | |
|---|---|---|---|---|
| 5,452,311 A | * | 9/1995 | Wells | G11C 16/32 714/708 |
| 5,574,944 A | | 11/1996 | Stager | |
| 5,590,345 A | * | 12/1996 | Barker | G06F 7/483 712/11 |
| 5,774,683 A | * | 6/1998 | Gulick | G06F 13/4027 710/104 |

(Continued)

FOREIGN PATENT DOCUMENTS

| | | |
|---|---|---|
| EP | 2645263 A2 | 10/2013 |
| JP | 0561748 A | 3/1993 |

(Continued)

OTHER PUBLICATIONS

Office Action from Taiwanese patent application No. 106114938, dated Jan. 18, 2018, 7 pp.

(Continued)

*Primary Examiner* — Prasith Thammavong
(74) *Attorney, Agent, or Firm* — Brooks, Cameron & Huebsch, PLLC (57) ABSTRACT

The present disclosure includes apparatuses and methods related to a memory protocol. An example apparatus can perform operations on a number of block buffers of the memory device based on commands received from a host using a block configuration register, wherein the operations can read data from the number of block buffers and write data to the number of block buffers on the memory device.

20 Claims, 4 Drawing Sheets

(56) References Cited

U.S. PATENT DOCUMENTS

| | | | | |
|---|---|---|---|---|
| 5,903,768 | A * | 5/1999 | Sato | G06F 9/383 |
| | | | | 712/1 |
| 5,915,265 | A | 6/1999 | Crocker et al. | |
| 5,937,423 | A * | 8/1999 | Robinson | G06F 3/0607 |
| | | | | 365/52 |
| 6,370,614 | B1 | 4/2002 | Teoman et al. | |
| 6,370,619 | B1 | 4/2002 | Ho et al. | |
| 7,007,099 | B1 * | 2/2006 | Donati | G06F 13/385 |
| | | | | 370/229 |
| 7,480,754 | B2 | 1/2009 | Priborsky et al. | |
| 7,711,889 | B2 | 5/2010 | Kudo et al. | |
| 7,870,351 | B2 | 1/2011 | Resnick | |
| 7,904,644 | B1 * | 3/2011 | Pinvidic | G06F 13/385 |
| | | | | 710/52 |
| 7,924,521 | B1 * | 4/2011 | Hudiono | G11B 5/59688 |
| | | | | 360/48 |
| 7,983,107 | B2 | 7/2011 | Moshayedi et al. | |
| 8,719,492 | B1 | 5/2014 | Asnaashari | |
| 8,769,192 | B2 | 7/2014 | Yeh | |
| 8,874,831 | B2 | 10/2014 | Lee et al. | |
| 9,104,583 | B2 | 8/2015 | Ambroladze et al. | |
| 9,128,634 | B1 | 9/2015 | Kang et al. | |
| 2001/0049770 | A1 | 12/2001 | Cal et al. | |
| 2002/0062459 | A1 | 5/2002 | Lasserre et al. | |
| 2003/0033461 | A1 | 2/2003 | Malik et al. | |
| 2003/0110322 | A1 | 6/2003 | Wolrich et al. | |
| 2004/0148482 | A1 * | 7/2004 | Grundy | G06F 12/06 |
| | | | | 711/167 |
| 2004/0205296 | A1 | 10/2004 | Bearden | |
| 2004/0260908 | A1 | 12/2004 | Malik et al. | |
| 2005/0160320 | A1 | 7/2005 | Elez | |
| 2005/0273549 | A1 | 12/2005 | Roohparvar | |
| 2006/0015683 | A1 | 1/2006 | Ashmore et al. | |
| 2006/0242332 | A1 | 10/2006 | Johnsen et al. | |
| 2007/0002612 | A1 | 1/2007 | Chang et al. | |
| 2007/0233990 | A1 | 10/2007 | Kuczynski et al. | |
| 2008/0082751 | A1 | 4/2008 | Okin et al. | |
| 2008/0162735 | A1 | 7/2008 | Voigt et al. | |
| 2008/0189452 | A1 | 8/2008 | Merry et al. | |
| 2008/0195800 | A1 * | 8/2008 | Lee | G06F 12/0246 |
| | | | | 711/103 |
| 2008/0270678 | A1 | 10/2008 | Cornwell et al. | |
| 2009/0006787 | A1 | 1/2009 | De Souza et al. | |
| 2009/0089492 | A1 * | 4/2009 | Yoon | G06F 13/1689 |
| | | | | 711/103 |
| 2009/0133032 | A1 | 5/2009 | Biles et al. | |
| 2009/0138665 | A1 | 5/2009 | Suzuki | |
| 2009/0164869 | A1 * | 6/2009 | Chuang | G06F 11/1068 |
| | | | | 714/763 |
| 2009/0276556 | A1 | 11/2009 | Huang | |
| 2010/0077175 | A1 | 3/2010 | Wu et al. | |
| 2010/0115142 | A1 | 5/2010 | Lim | |
| 2010/0250827 | A1 * | 9/2010 | Jullien | G06F 12/0868 |
| | | | | 711/103 |
| 2010/0312950 | A1 | 12/2010 | Hsieh | |
| 2010/0318742 | A1 | 12/2010 | Plondke et al. | |
| 2011/0170346 | A1 * | 7/2011 | Nagai | G11C 11/5628 |
| | | | | 365/185.2 |
| 2011/0268256 | A1 | 11/2011 | Ootsuka | |
| 2011/0320651 | A1 | 12/2011 | Poublan et al. | |
| 2012/0020161 | A1 * | 1/2012 | Haukness | G06F 12/0246 |
| | | | | 365/185.17 |
| 2012/0131253 | A1 | 5/2012 | McKnight et al. | |
| 2012/0159052 | A1 | 6/2012 | Lee et al. | |
| 2012/0278664 | A1 | 11/2012 | Kazui et al. | |
| 2013/0019057 | A1 | 1/2013 | Stephens | |
| 2013/0060981 | A1 | 3/2013 | Horn et al. | |
| 2013/0212319 | A1 | 8/2013 | Hida et al. | |
| 2013/0262745 | A1 | 10/2013 | Lin et al. | |
| 2013/0262761 | A1 | 10/2013 | Oh | |
| 2014/0032818 | A1 | 1/2014 | Chang et al. | |
| 2014/0047206 | A1 | 2/2014 | Ochiai | |
| 2014/0108714 | A1 | 4/2014 | Lee et al. | |
| 2014/0229699 | A1 | 8/2014 | Gurgi et al. | |
| 2014/0237157 | A1 | 8/2014 | Takefman et al. | |
| 2014/0269088 | A1 | 9/2014 | Pichen | |
| 2014/0344512 | A1 | 11/2014 | Nishioka | |
| 2014/0351492 | A1 | 11/2014 | Chen | |
| 2015/0006794 | A1 | 1/2015 | Kang et al. | |
| 2015/0012687 | A1 | 1/2015 | Huang et al. | |
| 2015/0052318 | A1 | 2/2015 | Walker | |
| 2015/0067291 | A1 | 3/2015 | Miyamoto et al. | |
| 2015/0212738 | A1 | 7/2015 | D'eliseo et al. | |
| 2015/0234601 | A1 | 8/2015 | Tsai et al. | |
| 2015/0279463 | A1 | 10/2015 | Berke | |
| 2015/0331638 | A1 | 11/2015 | Zaltsman et al. | |
| 2015/0363106 | A1 | 12/2015 | Lim et al. | |
| 2015/0378886 | A1 | 12/2015 | Nemazie et al. | |
| 2016/0026577 | A1 * | 1/2016 | Goodwin | G06F 12/04 |
| | | | | 711/118 |
| 2016/0041907 | A1 | 2/2016 | Jung et al. | |
| 2016/0070483 | A1 | 3/2016 | Yoon et al. | |
| 2016/0118121 | A1 | 4/2016 | Kelly et al. | |
| 2016/0232112 | A1 * | 8/2016 | Lee | G06F 13/1673 |
| 2016/0306566 | A1 | 10/2016 | Lu et al. | |
| 2016/0342487 | A1 | 11/2016 | Ware et al. | |
| 2017/0024297 | A1 | 1/2017 | Sogabe | |
| 2017/0160929 | A1 | 6/2017 | Ayandeh | |
| 2017/0308306 | A1 * | 10/2017 | Intrater | G06F 3/0611 |
| 2017/0351433 | A1 * | 12/2017 | Walker | G06F 3/0605 |
| 2018/0260329 | A1 * | 9/2018 | Galbraith | G06F 12/0875 |

FOREIGN PATENT DOCUMENTS

| | | | |
|---|---|---|---|
| TW | 201013400 | A | 4/2010 |
| TW | I363299 | B | 5/2012 |
| TW | 201314437 | A | 4/2013 |
| WO | 2010002753 | A1 | 1/2010 |
| WO | 2013007870 | A1 | 1/2013 |
| WO | 2015116468 | A1 | 8/2015 |

OTHER PUBLICATIONS

International Search Report and Written Opinion from international application No. PCT/US2017/029780, dated Jul. 18, 2017, 11 pp.
Search Report from related international patent application No. PCT/US2017/034487, dated Oct. 25, 2017, 22 pp.
International Search Report and Written Opinion from international application No. PCT/US2017/063581, dated Mar. 19, 2018, 13 pp.
Office Action from Taiwanese patent application No. 107102386, dated Sep. 12, 2018, 15 pp.
International Search Report and Written Opinion from international application No. PCT/US2018/014345, dated Jun. 22, 2018, 15 pp.
International Search Report and Written Opinion from international application No. PCT/US2018/018106, dated May 28, 2018, 19 pp.
International Search Report and Written Opinion from international application No. PCT/US2018/018124, dated Jun. 1, 2018, 14 pp.
Decision of Rejection from Taiwanese patent application No. 106114938, dated May 24, 2018, 6 pp.
Office Action from related Taiwanese patent application No. 106118556, dated May 11, 2018, 10 pp.
Office Action from Taiwanese patent application No. 106142145, dated Dec. 12, 2018, 16 pp.
Office Action from Taiwanese patent application No. 107108758, dated Jan. 28, 2019, 21 pp.
Search Report from related European patent application No. 17793026.0, dated Mar. 13, 2019, 7 pp.
Office Action from Chinese patent application No. 201780026941.4, dated Jul. 10, 2019, 12 pp.
Office Action from related Taiwan patent application No. 107108757, dated Nov. 8, 2019, 13 pages.

* cited by examiner

MEMORY PROTOCOL

PRIORITY INFORMATION

This application claims benefit of U.S. Provisional Application No. 62/346,201 filed Jun. 6, 2016, the specification of which is incorporated herein by reference.

TECHNICAL FIELD

The present disclosure relates generally to memory devices, and more particularly, to apparatuses and methods for a memory protocol.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

DETAILED DESCRIPTION

The present disclosure includes apparatuses and methods related to a memory protocol. An example apparatus can perform operations on a number of block buffers on the memory device based on commands received from a host using a block configuration register, wherein the operations can read data from the number of block buffers and write data to the number of block buffers on the memory device.

In one or more embodiments of the present disclosure, a block configuration register can be used to define a number of block buffers on a memory device. A host can have direct access to the block buffers and execute read and/or write commands on the block buffers. The block configuration register can include pairs of associated block buffer registers and target address registers, wherein the block buffer registers each include a start address and an end address for each block buffer and the target address registers each include a target address in a memory array associated with each block buffer. The host can send read and/or write commands to the memory device to read and/or write data from the block buffers associated with the start address, the end address, and the target address of the block buffers. The block configuration register can also include a status register that includes status information for data in the block buffers that is updated by the host as read and/or write commands are received and executed by memory device.

In one or more embodiments of the present disclosure, the memory protocol can be used to perform operations with deterministic and/or non-deterministic timing. The memory protocol can include sending read commands with a read increment value, wherein the read increment value indicates to the controller a value by which to increment a counter that is used to assign a memory device read identification number to the read command. The memory can include sending a barrier command from a host, wherein the barrier command indicates that commands previously received by the memory device are to be performed before commands received by the memory device subsequent to the barrier command.

In one or more embodiments, the memory protocol can include sending commands with a burst length signal that indicates a burst length for the memory device. The burst length signal can be based on a size of request for the command and/or on a type memory device on which the command will be executed. The memory protocol can include sending commands to set a buffer register that configures a buffer having a read buffer portion of a first particular size and a write buffer portion of a second particular size.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1:
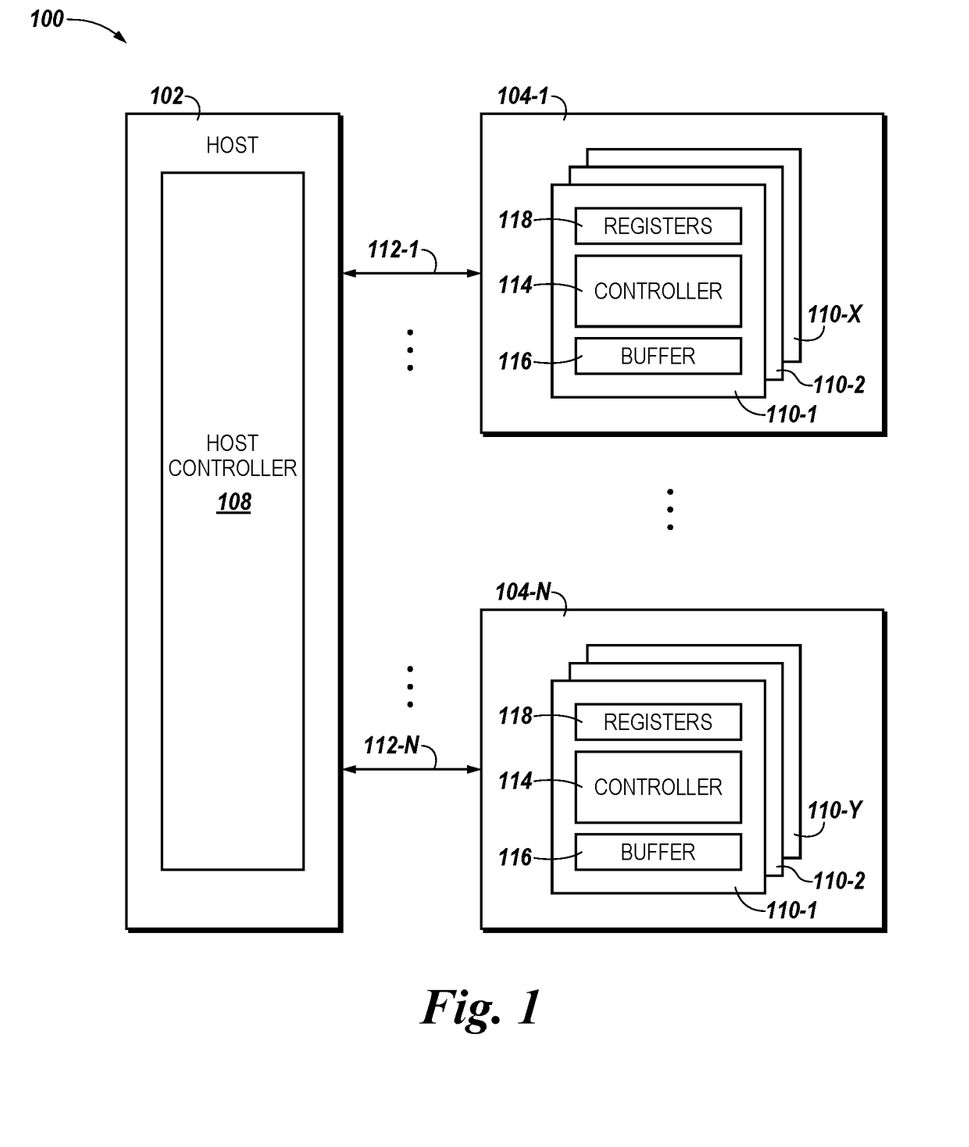
FIG. 1 is a block diagram of an apparatus in the form of a computing system including a memory system in accordance with a number of embodiments of the present disclosure.

FIG. 1 is a functional block diagram of a computing system 100 including an apparatus in the form of a number of memory systems 104-1 . . . 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory systems 104-1 . . . 104-N can include a one or more memory devices 110-1, . . . , 110-X, 110-Y. In one or more embodiments, the memory devices 110-1, . . . , 110-X, 110-Y can be dual in-line memory modules (DIMM). DIMMs can include volatile memory and/or non-volatile memory, such as a NVDIMM and DRAM DIMM, respectively for example. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1-4 use a DIMM as the memory module, but the protocol of the present disclosure can be used on any memory system where memory can execute deterministic and/or non-deterministic commands. In FIG. 1, memory system 104-1 is coupled to the host via channel 112-1 and can include memory devices 110-1, . . . , 110-X and memory system 104-N is coupled to the host via channel 112-N and can include memory devices 110-1, . . . , 110-Y. In this example, each memory device 110-1, . . . , 110-X, 110-Y includes a controller 114. Controller 114 can received commands from host 102 and control execution of the commands on a memory device. Also, in a number of embodiments, the protocol of the present disclosure could be implemented by a memory device (e.g., a DIMM) without a controller and execution of the commands using the protocol of the present disclosure could be built into the memory device. The host 102 can send commands to the memory devices 110-1, . . . , 110-X, 110-Y using the protocol of the present disclosure and/or a prior protocol, depending on the type of memory device. For example, the host can use the protocol of the present disclosure to communicate on the same channel (e.g., channel 112-1) with a NVDIMM and a prior protocol to communicate with a DRAM DIMM that are both on the same memory system.

As illustrated in FIG. 1, a host 102 can be coupled to the memory systems 104-1 . . . 104-N. In a number of embodiments, each memory system 104-1 . . . 104-N can be coupled to host 102 via a channel. In FIG. 1, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the memory devices 110-1, . . . , 110-X, 110-Y via channels 112-1 . . . 112-N. The host controller 108 can communicate with the memory devices 110-1, . . . , 110-X, 110-Y and/or the controller 114 on each of the memory devices 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and memory devices 110-1, . . . , 110-X, 110-Y on a number of buses, such as a data bus and/or an address bus, for example, via channels 112-1 . . . 112-N.

The host controller 108 and/or controller 114 on a memory device can include control circuitry, e.g., hardware, firmware, and/or software. In one or more embodiments, the host controller 108 and/or controller 114 can be an application specific integrated circuit (ASIC) coupled to a printed circuit board including a physical interface. Also, each memory device 110-1, . . . , 110-X, 110-Y can include a buffer 116 of volatile and/or non-volatile memory and a register 118. Buffer 116 can be used to buffer data that is used during execution of read commands and/or write commands. The buffer 116 can be split into a write buffer, a read buffer, and a number of block buffers. The amount of space that is dedicated to the write buffer and the amount of space dedicated to the read buffer can be controlled by the host controller 108 programming a number of registers 118. The host can control the amount of space in buffers 116 dedicated to the write buffer and the read buffer based on the type of commands that are being sent to a particular memory device. In a number of embodiments, each memory device 110-1, . . . , 110-X, 110-Y can have a fixed write buffer size and/or a fixed read buffer size. Buffers 116 can include a number of block buffers. The size of each of the number of block buffers can be controlled by the host by programming a number of registers 118. Registers 118 can be programmed to set the starting and ending address of each block register and also a target address in the memory array associated with each block register. The host can read and/or write data to the block registers by sending commands to memory devices 110-1, . . . , 110-X, 110-Y.

The memory devices 110-1, . . . , 110-X, 110-Y can provide main memory for the memory system or could be used as additional memory or storage throughout the memory system. Each memory device 110-1, . . . , 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the memory devices 110-1, . . . , 110-N. It will be appreciated by those skilled in the art that the number of address input connections can depend on the density and architecture of the memory devices 110-1, . . . , 110-X, 110-Y.

Figure 2A:
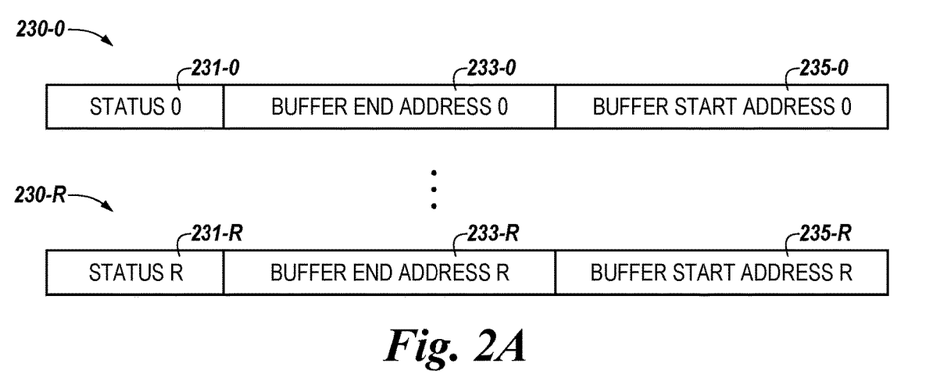
FIGS. 2A-2C illustrate registers and commands associated with a block buffer in accordance with a number of embodiments of the present disclosure.
Figure 2B:
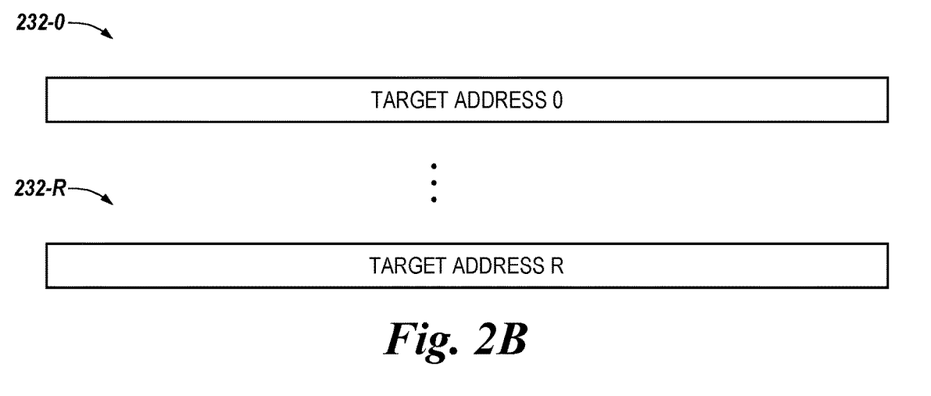
Figure 2C:
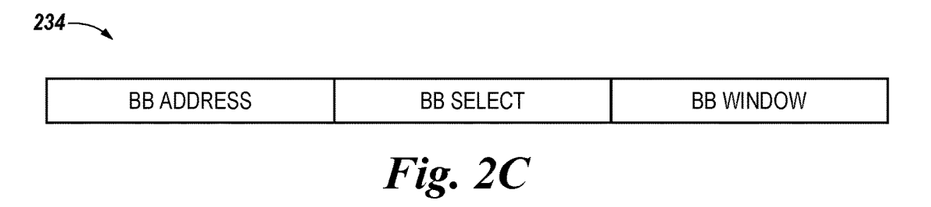

FIGS. 2A-2C illustrate registers and commands associated with a block buffer in accordance with a number of embodiments of the present disclosure. In a number of embodiments, a memory device can include a number of block buffers that are addressable by the host, where the host can send commands to perform read and/or write commands on the block buffers. The size of the block buffers can be indicated by block configuration registers that can be programmed by the host. The size of the block buffers can be programmed to match the size of block in the memory array of the memory device. FIG. 2A illustrates a block buffer address registers 230-0, . . . , 232-R of the block configuration registers and FIG. 2B illustrates target address registers 232-0, . . . , 232-R of the block configuration registers. The block configuration registers includes pairs of associated block buffer address registers and target address registers. Each block buffer address register is associated with a target address in the memory array of the memory device. Data that is written to a block buffer has indicated by the information in the corresponding block buffer registers will be written to the associated target address in the memory array when the data is committed to memory. Data that is being read from the block buffer is located and moved from the associated target address associated to the block. Each block buffer address register can include a buffer start address 235-0, . . . , 235-R, a buffer end address 233-0, . . . , 233-R, and status information 231-0, . . . , 231-R. The buffer start address and buffer end address for each buffer can be used to determine the size of the buffer. The status information can include information indication whether there is valid data in a block buffer, whether data associated with a command have been moved, and/or whether there is a recoverable and/or fatal error in block buffer data. There can also be a status register that stores the status information for each block buffer, so that only the status register needs to be read to determine the status of a particular block buffer.

FIG. 2C illustrates a command 234 for performing an operation in a block buffer. Command 234 includes block buffer window information, which indicates the command will be performed on a block buffer, block buffer select information, which indicates the block buffer on which the command will be executed, and block buffer address information, which indicates the address on the block buffer where data associated with the command will be written to and/or read from.

Figure 3:
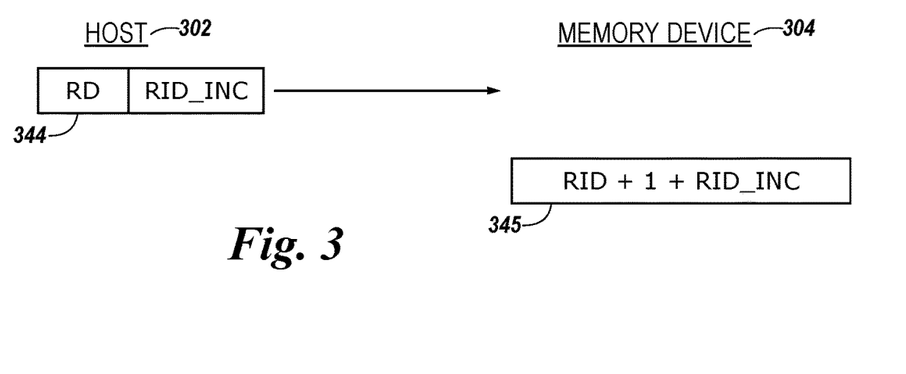
FIG. 3 illustrates a read command that includes read increment information in accordance with a number of embodiments of the present disclosure.

FIG. 3 illustrates a read command that includes read increment information in accordance with a number of embodiments of the present disclosure. In FIG. 3, a read command 344 can include a read identification number (RID) and read increment information (RID INC). The read identification number can be used to identify the command. For example, a host can assign a particular read identification number to a command and send the command to the memory device. The memory device can then assign a read identification number to the command. The memory device can include a counter to keep track of which read identification number to assign to a command. The counter is initialized at 0 and is incremented by 1 each time a read command is received by the memory device. In memory devices where commands are executed with non-deterministic timing, commands can be executed in any order by the memory device, therefore incrementing the counter by 1 each time may result in the read identification number assigned to a particular command by the host differing from the read identification number assigned to the particular command by the memory device. For example, the host and memory device can each have 4 available read identification numbers to assign to read commands and can any given read identification number can only be once time at any given time. When the host has assigned and sent all 4 commands to the memory device, but has only received an indication from the memory device that the first, second, and fourth commands have been executed, then the host cannot assign the third identification number to another command until the command with the third identification number has been executed by the memory device. The first and second read identification numbers can be used by the host again, but the third read identification number should not be used by the host. Read increment information can be sent with the read command to indicate to the memory device that a read identification number should be skipped. In example above, the read increment information can include a read increment amount of 1, indicating that the third identification number should be skipped. A memory device can increment the identification number to assign to a command by based on the read increment information, so that the next available read identification number assigned to a command by the host will also be assigned to the command by the memory device. In FIG. 3, the memory device 304 can receive command 344 from host 302 and assign a read identification number 345 that is based on the adding 1 and the value associated with the read increment (RID INC) information to the most recent read identification number assigned to a command by the memory device 304.

Figure 4:
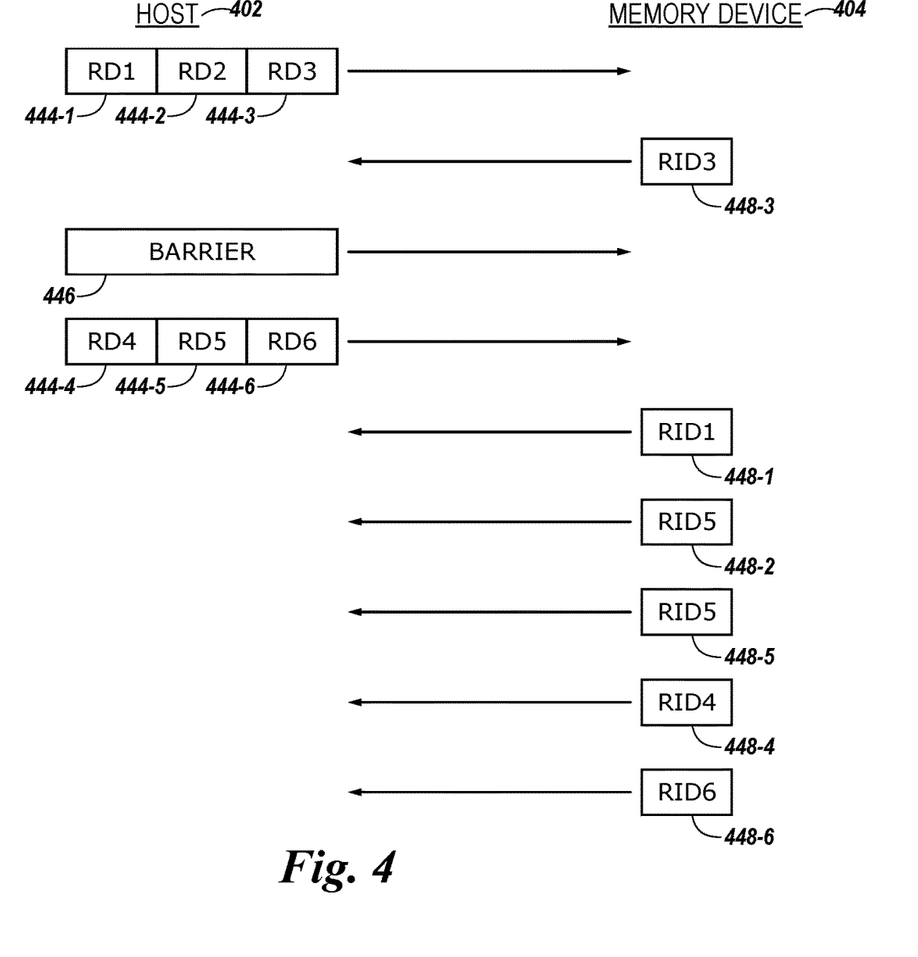
FIG. 4 illustrates of a number of read commands and a barrier command in accordance with a number of embodiments of the present disclosure.

FIG. 4 illustrates of a number of read commands and a barrier command in accordance with a number of embodiments of the present disclosure. In FIG. 4, a host 402 can send read command 444-1, 444-2, and 444-3 and barrier command 446 to a memory device 404. Barrier command 446 can indicate that the commands 444-1, 444-2, and 444-4, which were sent to the memory device 404 prior to the barrier command 446, will be executed before commands 444-4, 444-5, and 444-6, which were sent to the memory device 404 after barrier command 446. In FIG. 4, read identification (RID3) 448-3, which indicates that read command 444-3 has been executed, is sent to the host before barrier command 446 is sent to the memory device. Barrier command 446 indicates that read commands 444-1 and 444-2 are to be executed before any subsequent commands. The host sends read commands 444-4, 444-5, and 444-6 to the memory device after barrier command 446, which will be executed after read command 444-1 and 444-2. The memory device executes read commands 444-1 and 444-2 and sends read identifications 448-1 and 448-2. Once all the commands sent to the memory device before the barrier command are executed, the commands sent to the memory device after the barrier command can be executed. Therefore, the memory device executes read commands 444-4, 444-5, 444-6 and sends read identifications 448-4, 448-5, and 448-6 to the host 402.

In a number of embodiments, barrier commands can apply to all types of commands, only read commands, or only write commands. For example, a read barrier command can be sent to indicate that all read command sent prior to the barrier command are to be executed before any read command sent subsequent to the barrier command. Barrier commands can be used by a host to control the timing of execution of commands when a memory device can execute commands with non-deterministic timing.

Figure 5:
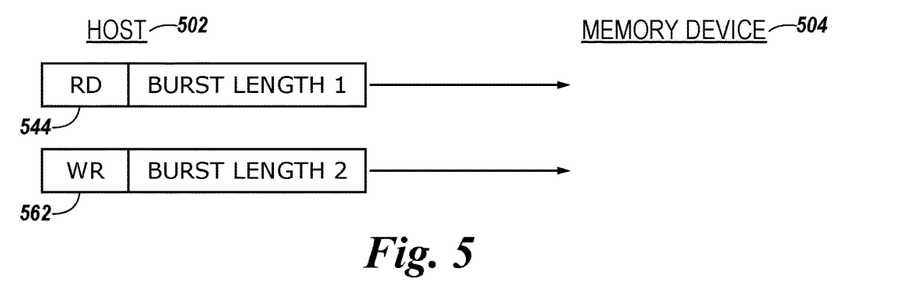
FIG. 5 illustrates a read command and a write command that includes burst length information in accordance with a number of embodiments of the present disclosure.

FIG. 5 illustrates a read command and a write command that includes burst length information in accordance with a number of embodiments of the present disclosure. In FIG. 5, a read command 544 can include a burst length indication and a write command 562 can include a burst length indication. The burst length can be dynamically changed by the host via an indication in read and/or write commands. A burst length indication can be sent by a host 502 to a memory device 504 in any type of command, including a burst length indication command. The burst length can be changed by the host based on an amount of the data associated with a command, a type of command, a type of memory device on which a command will be executed, and whether latency or bandwidth optimization is desired.

Figure 6A:
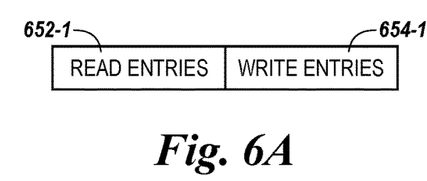
FIGS. 6A-6D illustrate a register to indicate a size of a read buffer and write buffer in accordance with a number of embodiments of the present disclosure.
Figure 6B:
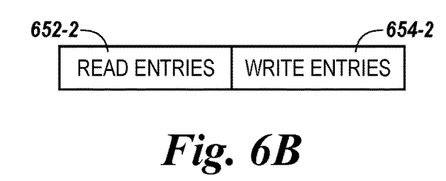
Figure 6C:
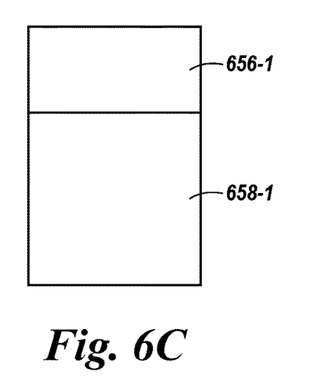
Figure 6D:
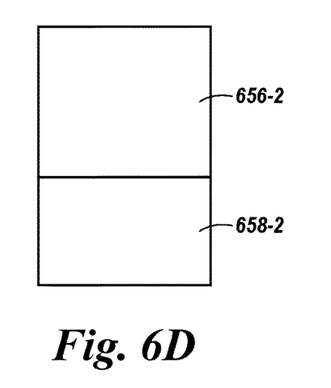

FIGS. 6A-6D illustrate a register to indicate a size of a read buffer and write buffer in accordance with a number of embodiments of the present disclosure. In FIGS. 6A and 6B, a register can be programmed to indicate a number of read entries 652-1 and 652-2 and a number of write entries 654-4 and 654-2. The register can be located on a memory device and a host can program the register. The number of read entries 652-1 and 652-2 and a number of write entries 654-4 and 654-2 indicated in the register can be used to control a size of a read buffer and a write buffer. For example, read entry indication 651-1 can correspond to a read buffer 656-1 having a particular size and write entry indication 654-1 can correspond to a write buffer 658-1 having a particular size. The size of read buffer 656-1 can be smaller than the size of write buffer 658-1. Read entry indication 651-2 can correspond to a read buffer 656-2 having a particular size and write entry indication 654-2 can correspond to a write buffer 658-2 having a particular size. The size of read buffer 656-2 can be larger than the size of write buffer 658-1 and read buffer 656-1. The read entry indication 652 and write entry indication 654 in the register can be updated by the host based on the relative quantities of read and write commands that are being issued by the host. The read entry indication 652 and write entry indication 654 can be updated whenever the current read and/or write buffer entries can be accommodated by the update read and/or write indication.

In a number of embodiments, a buffer can include both read and write entries and a register can be programmed to define a threshold number of read entries for the buffer and a threshold number of write entries for the buffer. The host can track the number of outstanding read entries and write entries in the buffer to ensure that the buffer does not contain more entries than threshold number of read entries and the threshold number of write entries defined by the register. The register can be updated to changes the threshold number of read entries for the buffer and a threshold number of write entries for the buffer.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device comprising a number of block buffers; and
a controller coupled to the memory device configured to:
perform operations on the number of block buffers of the memory device based on commands received from a host using a block configuration register, wherein a size of the block buffers is programmed by the block configuration register to match a size of a block in the memory device based on a buffer start address and a buffer end address, wherein the block configuration register includes target address registers that identify target addresses of data in the memory device associated with the operations, wherein the target address registers are paired with the buffer start address and the buffer end address for each of the number of block buffers, and wherein the operations are performed to read data from the number of block buffers that is retrieved from the target addresses in the memory device and write data to the number of block buffers on the memory device that is then written to the target addresses in the memory device.

2. The apparatus of claim 1, wherein the block configuration register includes a block buffer address register that includes the buffer start address, the buffer end address, and status information for each of the number of block buffers.

3. The apparatus of claim 1, wherein the block configuration register includes the target address register that includes a target address for each of the number of block buffers.

4. The apparatus of claim 1, wherein the block configuration register includes a status register that includes status information for each of the number of block buffers.

5. The apparatus of claim 1, wherein the controller is configured to receive a command from the host to program the block configuration register setting the buffer start address for each of the number of block buffers, the buffer end address for each of the number of block buffers, and a corresponding target address in an array of memory cells on the memory device.

6. The apparatus of claim 5, wherein the controller is configured to receive a command from the host to write data to the number of block buffers.

7. The apparatus of claim 6, wherein the controller is configured to receive a command from the host to commit a portion of data from the number of block buffers to the corresponding target address in the array of memory cells.

8. The apparatus of claim 5, wherein the controller is configured to receive a command from the host to read data from the number of block buffers.

9. The apparatus of claim 5, wherein the controller is configured to cause data from the corresponding target address in the array of memory cells to be written to the number of block buffers and to read the data from the number of block buffers based on the command from the host.

10. The apparatus of claim 5, wherein the controller is configured to cause status information for the number of block buffers to be updated upon completion of the commands.

11. A method comprising:
receiving one or more commands from a host at a block configuration register of a memory device that comprises a number of block buffers,
identifying target addresses of data in the memory device associated with operations based on one or more target address registers of the block configuration register, wherein the target address registers are paired with a buffer start address and a buffer end address for each of the number of block buffers; and
performing, at the memory device, operations on the number of the block buffers of the memory device based on the one or more commands received from the host, wherein a size of the block buffers is programmed by the block configuration register to match a size of a block in the memory device based on the buffer start address and the buffer end address, and wherein the operations comprise at least one of:
reading data from the number of block buffers, the data retrieved from the target addresses in the memory device; or
writing data to the number of block buffers on the memory device and to the target addresses in the memory device.

12. The method of claim 11, wherein the block configuration register includes a block buffer address register that includes the buffer start address, the buffer end address, and status information for each of the number of block buffers.

13. The method of claim 11, wherein the block configuration register includes the target address register that includes a target address for each of the number of block buffers.

14. The method of claim 11, wherein the block configuration register includes a status register that includes status information for each of the number of block buffers.

15. The method of claim 11, further including receiving a command from the host to program the block configuration register by setting the buffer start address for each of the number of block buffers, the buffer end address for each of the number of block buffers, and a corresponding target address in an array of memory cells on the memory device.

16. The method of claim 15, further including receiving a command from the host to write data to the number of block buffers.

17. The method of claim 16, further including receiving a command from the host to commit a portion of data from the number of block buffers to the corresponding target address in the array of memory cells.

18. The method of claim 15, further including receiving a command from the host to read data from the number of block buffers.

19. The method of claim 15, further including causing data from the corresponding target address in the array of memory cells to be written to the number of block buffers and to read the data from the number of block buffers based on the command from the host.

20. A method comprising:
transmitting one or more commands from a host to a block configuration register of a memory device that comprises a number of block buffers;
communicating data between the number of block buffers of the block configuration register of the memory device and the host in response to the one or more commands, wherein the data is written to or read from the number of block buffers based at least in part on:
identification of target address of the data in the memory device associated with an operation based on one or more target address registers of the block configuration register, wherein the target address registers are paired with a buffer start address and a buffer end address for each of the number of block buffers; and
performance of the operations on the number of block buffers of the memory device based on the one or more commands transmitted from the host, wherein a size of the block buffers is programmable by the block configuration register to match a size of a block in the memory device based on the buffer start address and the buffer end address, wherein the operations comprise at least one of:
reading the data from the number of block buffers, the data received from the target addresses in the memory device; or writing the data to the number of block buffers on the memory device and to the target address in the memory device.

* * * * *